United States Patent
Arumilli et al.

(10) Patent No.: US 8,565,092 B2
(45) Date of Patent: Oct. 22, 2013

(54) DYNAMIC FLOW REDISTRIBUTION FOR HEAD OF LINE BLOCKING AVOIDANCE

(75) Inventors: Subbarao Arumilli, Santa Clara, CA (US); Prakash Appanna, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 12/949,097

(22) Filed: Nov. 18, 2010

(65) Prior Publication Data

US 2012/0127860 A1    May 24, 2012

(51) Int. Cl.
*H04L 12/26* (2006.01)

(52) U.S. Cl.
USPC .......................................................... 370/235

(58) Field of Classification Search
USPC .................. 370/235, 401, 412–418, 428, 429
See application file for complete search history.

(56) References Cited

U.S. PATENT DOCUMENTS

| | | | |
|---|---|---|---|
| 6,765,867 B2 | 7/2004 | Shanley et al. | |
| 6,771,601 B1 * | 8/2004 | Aydemir et al. | 370/231 |
| 6,829,245 B1 * | 12/2004 | Medina et al. | 370/413 |
| 6,856,595 B1 * | 2/2005 | Brown | 370/229 |
| 7,782,885 B1 | 8/2010 | Sabato et al. | |
| 7,792,131 B1 | 9/2010 | Ma et al. | |
| 7,864,818 B2 | 1/2011 | Fong et al. | |
| 2002/0089994 A1 | 7/2002 | Leach et al. | |
| 2003/0012214 A1 | 1/2003 | Munter | |
| 2003/0058878 A1 * | 3/2003 | Minnick et al. | 370/412 |
| 2003/0108056 A1 * | 6/2003 | Sindhu et al. | 370/401 |
| 2003/0123455 A1 * | 7/2003 | Zhao et al. | 370/398 |
| 2005/0053046 A1 * | 3/2005 | Wang | 370/338 |
| 2007/0014240 A1 | 1/2007 | Kumar et al. | |
| 2007/0171929 A1 | 7/2007 | Kim et al. | |
| 2007/0223482 A1 | 9/2007 | Wyatt | |

(Continued)

FOREIGN PATENT DOCUMENTS

WO         0205494 A1    1/2002

OTHER PUBLICATIONS

International Search Report and Written Opinion in counterpart International Application No. PCT/US2011/048185, mailed Nov. 11, 2011.

*Primary Examiner* — Chi Pham
*Assistant Examiner* — Fahmida Chowdhury
(74) *Attorney, Agent, or Firm* — Edell, Shapiro & Finnan, LLC

(57) ABSTRACT

An apparatus and related methods are provided to greatly reduce the negative impact of head of line (HOL) blocking. At a device (e.g., switch, router, etc.) configured to forward packets in a network, new packets that are to be forwarded from the device to other devices in the network are stored in a memory of the device. Entries are added to a queue link list for the at least one queue as new packets are added to the at least one queue. A detection is made when the at least one queue exceeds a threshold indicative of head of line blocking. For new packets that are to be added to the at least one queue, entries are added to a sub-queue link list for the plurality of sub-queues such that packets are assigned to different ones of a plurality of sub-queues when the at least one queue exceeds the threshold. Packets are output from the memory for the plurality of sub-queues according to the sub-queue link list.

23 Claims, 10 Drawing Sheets

(56) References Cited

U.S. PATENT DOCUMENTS

| | | |
|---|---|---|
| 2008/0025234 A1 | 1/2008 | Zhu et al. |
| 2008/0123671 A1 | 5/2008 | Spencer |
| 2009/0252035 A1 | 10/2009 | Kukunaga et al. |
| 2009/0316711 A1* | 12/2009 | Memon et al. ............ 370/412 |
| 2010/0082848 A1* | 4/2010 | Blocksome et al. ............ 710/22 |
| 2011/0016223 A1 | 1/2011 | Iannaccone et al. |
| 2011/0267942 A1 | 11/2011 | Aybay et al. |
| 2011/0276775 A1 | 11/2011 | Schuetz |
| 2012/0278400 A1 | 11/2012 | Elson et al. |
| 2012/0307641 A1 | 12/2012 | Arumilli et al. |

* cited by examiner

59

DYNAMIC FLOW REDISTRIBUTION FOR HEAD OF LINE BLOCKING AVOIDANCE

TECHNICAL FIELD

The present disclosure relates to avoiding head of line blocking issues in network packet forwarding devices.

BACKGROUND

Network switches, routers and other devices that forward packets in a network can be forced to delay the forwarding of packets in a given packet flow when a downstream switch or other destination device becomes unable to accept new packets in that flow. In some applications, packet flows are assigned to classes of service that the switch or packet processor needs to honor. However, within one class of service, some flows may affect the quality of service for other like flows. Since the assignment of packets for a flow to queues is performed at the input port of the switch, the enqueuing process is unaware of a scenario where one flow within a class is degrading the quality of service of other flows. In some cases, this degradation may result in a violation of a service agreement and cause application level issues. The foregoing situation is also known as the head of line (HOL) blocking problem.

DESCRIPTION OF EXAMPLE EMBODIMENTS

Overview

An apparatus and related methods are provided herein to greatly reduce the negative impact of head of line (HOL) blocking. HOL blocking is problematic in frame processing switches or routers due to "bursty" traffic, very large packets, etc. The packet processing techniques described herein targets only problem queues at a switch, router or other device and consequently uses minimal gates or other computational resources. At a device (e.g., switch, router, etc.) configured to forward packets in a network, new packets that are to be forwarded from the device to other devices in the network are stored in a memory of the device. A queue link list is stored defining at least one queue of packets stored in the memory to be read out from the memory and forwarded from the device. Entries are added to the queue link list for the at least one queue as new packets are added to the at least one queue. Packets are output from the memory for the at least one queue according to entries in the queue link list. Detection is made when the at least one queue exceeds a threshold indicative of head of line blocking. Adding of entries to the queue link list for the at least one queue is terminated when the at least one queue is detected to exceed the threshold. A sub-queue link list is stored that defines a plurality of sub-queues for packets stored in the memory. For new packets that are to be added to the at least one queue, entries are added to the sub-queue link list for the plurality of sub-queues such that packets are assigned to different ones of the plurality of sub-queues when the at least one queue exceeds the threshold. Packets are output from the memory for the plurality of sub-queues according to the sub-queue link list after all packets in the queue link list for the at least one queue have been output from the memory.

Example Embodiments

Figure 1:
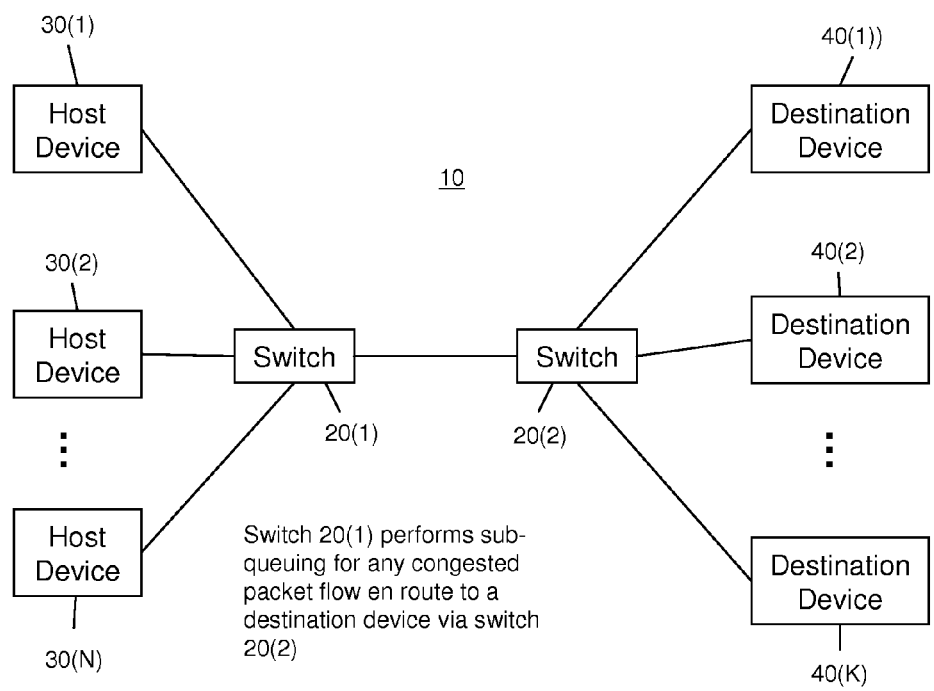
FIG. 1 is an example of a network diagram in which at least one of two switches is configured to perform a sub-queuing scheme for a congested packet flow.

Referring first to FIG. 1, a network is shown at reference numeral 10 comprising first and second packet (frame) processing switches or routers (simply referred to herein as switches) 20(1) and 20(2). In the example network topology shown in FIG. 1, the switch 20(1) connects to a plurality of host devices 30(1)-30(N) and switch 20(2) connects to a plurality of destination devices 40(1)-40(K). The host devices 30(1)-30(N) may be servers that have content to be sent to one of the destination devices 40(1)-40(K) via switches 20(1) and 20(2). Either or both of switches 20(1) and 20(2) are configured to perform the sub-queuing techniques described herein in order to reduce any HOL blocking problems.

Figure 2:
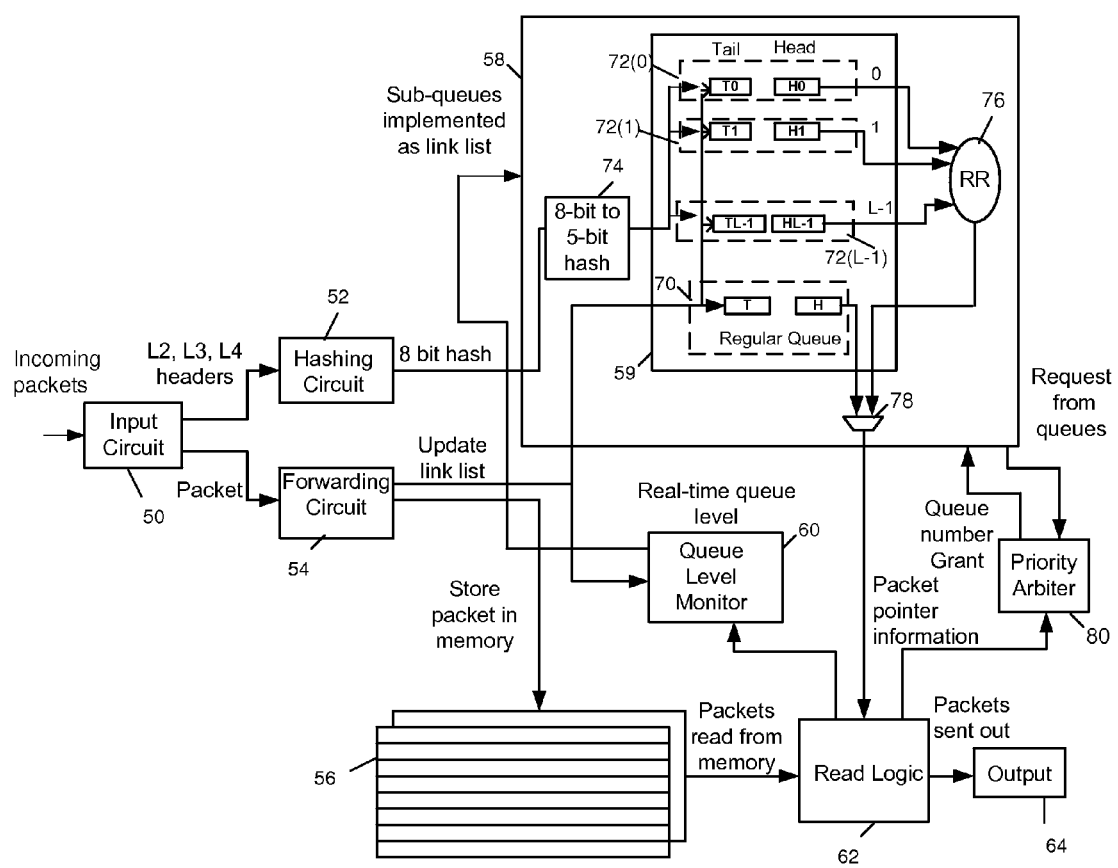
FIG. 2 is an example of a block diagram of a switch, router or other similar device that is configured to perform the sub-queuing scheme.

Reference is now made to FIG. 2 for a description of a switch, e.g., switch 20(1), that is configured to performing the sub-queuing techniques. This same block diagram is applicable to a router or other device that forwards packet in a network. The switch comprises an input circuit 50, a hashing circuit 52, forwarding circuit 54, a collection of memory arrays 56 to store incoming packets to be forwarded, a queuing subsystem 58 that stores a queue list and a plurality of sub-queues, a queue level monitor circuit 60, a read logic circuit 62 and an output circuit 64. The memory arrays 56 serve as a means for storing packets that are to be forwarded in the network. The input circuit 50 receives incoming packets to the switch, and the forwarding circuit 54 directs the incoming packets into queuing subsystem 58. The forwarding circuit 54 also updates a link list memory in the queuing subsystem 58 to indicate the writing of new packets in memory 56. The hashing circuit 52 makes a hashing computation on parameters of packets, e.g., headers such as any one or more of the Layer-2, Layer-3 and Layer-4 headers in order to identify the flow that each packet is part of and the destination of the packet. In one example, the hashing circuit 52 computes an 8-bit hash on the headers and in so doing determines the queue to which the packet should be added in the link list memory 59. The forwarding circuit 54 implements lookup tables. Using fields or subfields (from the Layer-2, Layer-3, and Layer-4 headers) from the header of the packet, the forwarding circuit 54 performs a look up in one or more destination tables to determine where the destination port where the packet is to be delivered or is to be dropped.

The queuing subsystem 58 comprises a memory 59 that is referred to herein as the link list memory. In one form, the memory 59 is implemented by a plurality of registers, but it may be implemented by allocated memory locations in the memory arrays 56, by a dedicated memory device, etc. In general, the memory 59 serves as a means for storing a queue link list defining at least one queue of packets stored in the memory arrays 56 and for storing a sub-queue link list defining a plurality of sub-queues for packets stored in the memory arrays 56.

The link list memory 59 comprises memory locations (e.g., registers) allocated for at least one queue 70 (herein also referred to as a "regular" queue) and a plurality of sub-queues 72(0)-72(L-1). The regular queue stores an identifier for each packet stored in memory 56 that is part of the regular queue in order from head (H) to tail (T) of the queue. Likewise, each sub-queue stores an identifier for each packet stored in memory 56 that is part of a sub-queue also in order from H to T for each sub-queue. As will become apparent hereinafter, there are examples described herein in which there a plurality of regular queues for each of a plurality of classes of service (COS).

The queuing subsystem 58 also comprises an 8-bit to 5-bit hashing circuit 74, a round robin (RR) arbiter 76 and an adder or sum circuit 78. The 8-bit to 5-bit hashing circuit 74 is configured to compute a 5-bit hash computation on packet headers to determine which of a plurality of sub-queues to assign a packet when it is determined to use sub-queues, as will become more apparent hereinafter. The 8-bit to 5-bit hashing circuit 74 is provided because the 8-bit hashing circuit 52 is a common component in switches and rather than re-design the switch to provide a lesser degree of hashing for enqueuing packets in the plurality of sub-queues, the additional hashing circuit 74 is provided. The hashing circuit 52 serves as a means for adding entries to a queue link list for at least one queue as new packets are added to the at least one queue. Moreover, the hashing circuit 52 in combination with the hashing circuit 74 serves as a means for adding entries to the sub-queue link list for the plurality of sub-queues such that packets are assigned to different ones of the plurality of sub-queues when at least one queue exceeds the aforementioned threshold indicative of HOL blocking.

The RR arbiter 76 selects a packet from one of the plurality of sub-queues 72(0)-72(L-1) and directs it to the adder 78. The RR arbiter 76 comprises a digital logic circuit, for example, that is configured to select a packet from one of the sub-queues according to any of a variety of round robin selection techniques. The other input to the adder 78 is an output from the regular queue 70.

The queue level monitor 60 is a circuit that compares the current number of packets in the regular queue and in the sub-queues with a predetermined threshold. In another form, the queue level monitor 60 determines the total number of bytes in a queue or sub-queue. Thus, it should be understood that references made herein to the queue level monitor circuit comparing numbers of packets with a threshold may involve comparing numbers of bytes with a threshold. In one example, the queue level monitor 60 comprises a counter and a comparator that is configured to keep track of the amount of data (in bytes) stored in memory 56 for each queue. There is a dedicated queue level monitor 60 for each regular queue. Thus, since only one regular queue is shown in FIG. 2, only one queue level monitor 60 is shown, but this is only an example. At the time packets are buffered in the memory 56, the counter of the queue level monitor (for that destination port and queue for which the packet is scheduled to go out) is incremented by the number of bytes in the packet. When a packet is read out of the memory 56 and sent out by the read logic circuit 62, the counter in the queue level monitor 60 for that queue is decremented by the number of bytes in the packet that is sent out. The queue level monitor 60 thus serves as a means for detecting when at least one queue exceeds a threshold indicative of HOL blocking as well as when the at least one queue hits another threshold, e.g., 0 indicating that it is empty.

The read logic circuit 62 is configured to read packets from the memory 56 to be transmitted from the switch via the output 64. The order that the read logic circuit 62 follows to read packets from the memory 56 is based on the identifiers supplied from the link list memory 59 in the regular queue or plurality of sub-queues as described further hereinafter.

The read logic circuit 62 and output circuit 64 serve as a means for outputting packets from the memory 56. As will become apparent hereinafter, the read logic circuit 62 and output circuit 64 serve as a means for outputting packets from the memory 56 for the plurality of sub-queues according to the sub-queue link list in memory 59 after all packets in the queue link list in memory 59 for at least one queue have been output from the memory 56.

The hashing circuit 52 serves as a means for adding entries to a queue link list for at least one queue as new packets are added to the at least one queue. Moreover, the hashing circuit 52 in combination with the hashing circuit 74 serves as a means for adding entries to the sub-queue link list for the plurality of sub-queues such that packets are assigned to different ones of the plurality of sub-queues when at least one queue exceeds the aforementioned threshold indicative of HOL blocking.

There is also a priority arbiter logic circuit 80 that is configured to schedule which of a plurality of regular queues is serviced based on a software configuration. Multiple COS queues are described hereinafter in connection with FIGS. 4 and 5. The priority arbiter 80 together with the read logic circuit 62 allows a packet to be read out of packet memory 56 and sent as output via the output circuit 64. The priority arbiter 80 may be implemented separately or as part of the read logic circuit 62 as this block has the ultimate authority or control from which queue a packet will be read. In one implementation, the priority arbiter 80 comprises digital logic circuitry and a plurality of counters to keep track of queue selections.

The general sequence of events for operation of the priority arbiter 80 and related logic circuits shown in FIG. 2 is as follows. Request from the queues (when multiple regular queues are employed) are sent to the priority arbiter 80. The priority arbiter 80 generates a queue number grant and sends it back to the queuing subsystem 58. The RR arbiter 76 generates a packet pointer for a packet (from the selected sub-queue) and sends the packet pointer information to the read logic circuit 62, which retrieves the appropriate packet from the packet memory 56 for output via the output circuit 64. The read logic circuit 62 also feeds back information concerning the output packet to the priority arbiter 80 in order to update its own internal counters.

The sub-queuing techniques described herein are applicable when there is one or a plurality of classes of services of packet flows handled by the switch. FIG. 2 shows a single regular queue for the case where there is a single class of service. If the switch were to handle packet flows for a plurality of classes of service, then there would be memory locations or registers allocated for a regular queue for each of the classes of service.

Figure 3:
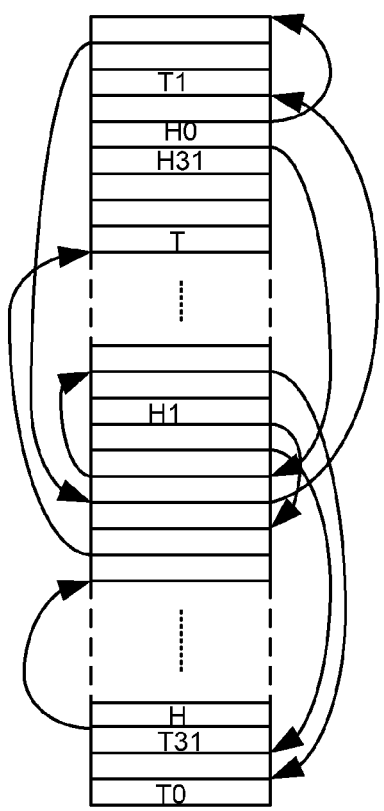
FIG. 3 is a diagram illustrating an example of queue link list and sub-queue link list stored in the device shown in FIG. 2.

FIG. 3 shows an arrangement of the link list memory 59 for the regular queue 70 and sub-queues. The arrows show the linking of the packet pointers in a queue. The start point for a queue (or sub-queue) is the head (H) and from the head the arrows can be traversed to read all the packet pointers until the tail (T) is reached, which is the last packet pointer for a queue (or sub-queue). This structure is used to honor in order packet delivery (the order the packets came in). The link list H to L is the regular link list while the link list H# to T# is for the sub-queues numbered 0-31 in the example of FIG. 3. This shows that the same resource (memory structure) that is used to store the order of packet delivery is also used for the sub-queues, thereby avoiding any overhead to accommodate the sub-queues. Packets in a queue need to be linked together so that they can be sent in the order they are received. When subsequent packets arrive for a queue, they need to be linked to the previous packets. When transmitting packets out, the read logic follows the links to send the packets out in order. The link list memory 59 holds these packet links as shown in FIG. 3. The arrows point to the next packet in that queue. Since the packet pointers are unique, there can be link lists for different queues in the same memory structure. FIG. 3 shows a single memory containing multiple queue link lists (each corresponding to different queues and/or sub-queues).

Creation of Sub-Queues

Figure 4:
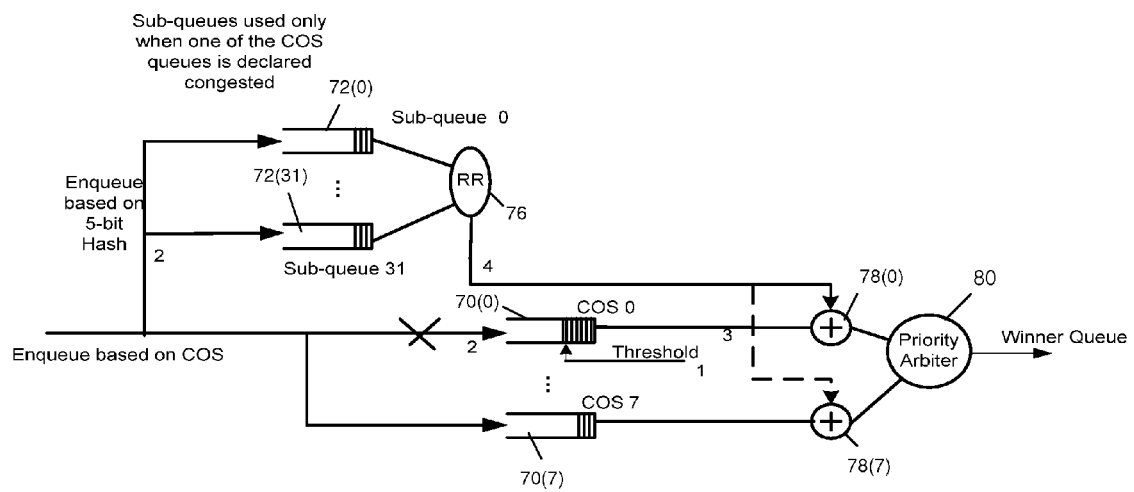
FIGS. 4 and 5 are diagrams depicting operations associated with sub-queuing scheme.

Reference is now made to FIG. 4. In the example shown in FIG. 4, there are a plurality of classes of service that the switch handles, indicated as COS 0 through COS 7. There is a regular queue for each COS indicated at reference numerals 70(0)-70(7), respectively. There are 32 sub-queues in this example shown at reference numerals 72(0)-72(31).

Packets are enqueued to one of the COS regular queues 70(0) to 70(7) based on their COS. For example, packets in COS 0 are all enqueued to queue 70(0), packets in COS 1 are enqueued to queue 70(1), and so on. The priority arbiter 80 selects packets from the plurality of COS regular queues 70(0)-70(7) after adders shown at 78(0)-78(7) associated with each regular queue 70(0)-70(7). The RR arbiter 76 selects packets from the plurality of sub-queues 72(0)-72(31) according to a round robin scheme. The output of the RR arbiter 76 is coupled to a corresponding one of the adders 78(0)-78(7) associated with the regular sub-queues 70(0)-70(7), respectively, depending on which of the COS regular queues is selected for sub-queuing.

As explained above in connection with FIG. 2, packets are enqueued to the sub-queues based on an 8-bit hash. The 8-bit hash guarantees that packets for any flow will be enqueued to the same sub-queue, thereby maintaining in order delivery. The 8-bit hash is re-hashed to a 5-bit hash that indexes to one of the sub-queues. The 8-bit rehashing scheme minimizes clumping to one single queue.

In this example, the states of the 8 regular queues 70(0)-70(7) are sent to the priority arbiter 80. The priority arbiter 80 then checks with the software configuration parameters (which are tied to the classes of services served by the device) to decide which is the next COS queue to be serviced. A higher priority COS will be serviced more often than a lower priority COS. The priority arbiter 80 then sends the decision (which queue will be serviced next), referred to as the queue number grant in FIG. 2, to the queuing subsystem 58. The packet pointer information for the packet at the head of the selected queue is sent, via the appropriate one of the adders 78(0)-78(7), to the read logic 62 that reads the packet from the packet memory 56 and sends it out via the output circuit 64. The priority arbiter 80 then updates the head of the selected queue with the next packet pointer by traversing the selected queue link list.

The RR arbiter 76 pre-selects one of the 32 sub-queues 72(0)-72(31) in a RR, weighted round robin (WRR) or deficit WRR (DWRR) fashion and presents this request to the priority arbiter 80. If the priority arbiter (PA) 80 selects this queue, the packet pointer from this sub-queue is supplied to the read logic circuit 62 for eventual packet transmission.

Any of the COS regular queues 70(0)-70(7) (most likely the lowest priority queue) can accumulate packets (grow) beyond a configured predetermined threshold. A sequence of events or operations labeled "1"-"4" in FIG. 4 illustrate creation of the sub-queues. In the example of FIG. 4, COS 70(0) has accumulated packets greater than the threshold. This is detected at "1" by the queue level monitor 60. At "2", the COS queue 70(0) is declared to be congested and new packets are no longer enqueued into COS queue 70(0) only. Packets to other COS queues are continued to be sent to their respective COS queues. At this point, packets for COS queue 70(0) are enqueued into the sub-queues 72(0)-72(31) using the aforementioned 5-bit hashing computation to select the sub-queue for each packet associated with COS queue 70(0). In this example, 32 sub-queues are effectively created "on the fly". The sub-queues are not yet de-queued.

At "3", COS queue 70(0) is continued to be de-queued via the priority arbiter grant operation 80 until COS queue 70(0) is empty. At "4", after the COS 70(0) queue is empty, packets from the sub-queues 72(0)-72(31) are de-queued by the RR arbiter 76. Since the COS queue 70(0) is completely de-queued before the sub-queues are de-queued, packets for a given flow are ensured to always be de-queued in order.

If the 5-bit hash function puts all the flows into one of the sub-queues 72(0)-72(31), then the queuing and de-queuing operations will behave as if there are no sub-queues.

Sub-queue Collapsing

Figure 5:
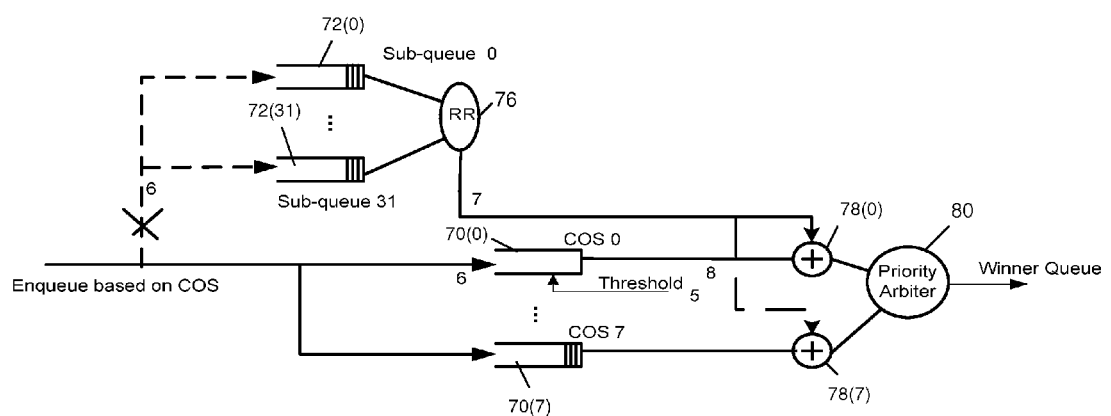

Once the traffic for a COS queue that is currently using the sub-queues reaches a certain threshold (e.g., it is empty), the sub-queues 72(0)-72(31) are collapsed into the original queue. FIG. 5 illustrates the sequence of operations or events labeled "5"-"8" associated with collapsing the sub-queues.

Whenever the traffic to the COS queue that is currently using the sub-queues 72(0)-72(31) reduces to a certain threshold and that COS queue is empty, the "freeing" of the sub-queues 72(0)-72(31) begins. At "5", this is triggered by a signal from the queue level monitor 60 indicating that the COS queue is empty. At "6", packets are no longer enqueued to the sub-queues 72(0)-72(31). Instead, packets are enqueued the original COS queue, e.g., COS queue 70(0) in the example of FIG. 5.

At "7", packets are continued to be de-queued from the sub-queues 72(0)-72(31) until all of sub-queues 72(0)-72(31) are empty. At "8", after all the sub-queues 72(0)-72(31) are empty, the original COS queue is de-queued. This ensures that packets within a flow are always de-queued in proper order.

At this point, the sub-queues 72(0)-72(31) are declared to be free and available for use by any COS queue that is determined to be congested.

As depicted by the examples of FIGS. 4 and 5, all the flows belonging to a particular class of service and destined to go out of a particular port are queued to the same queue. If HOL blocking is detected (by monitoring the level of the queue in real-time), the problem queue is split into a number of logical sub-queues on the fly. The flows are then redistributed among the sub-queues using a hashing scheme that guarantees in order packet delivery within a flow. The sub-queues are then serviced in a round robin, WRR or DWRR fashion. This effectively mitigates HOL blocking by allowing other flows to be scheduled or sent out the port. Once the level of the original problem queue falls below certain threshold (indicating that HOL blocking is absent), the sub-queues are collapsed into a single queue. The sub-queues can be reused again for other problem queues in the same fashion.

Figure 6:
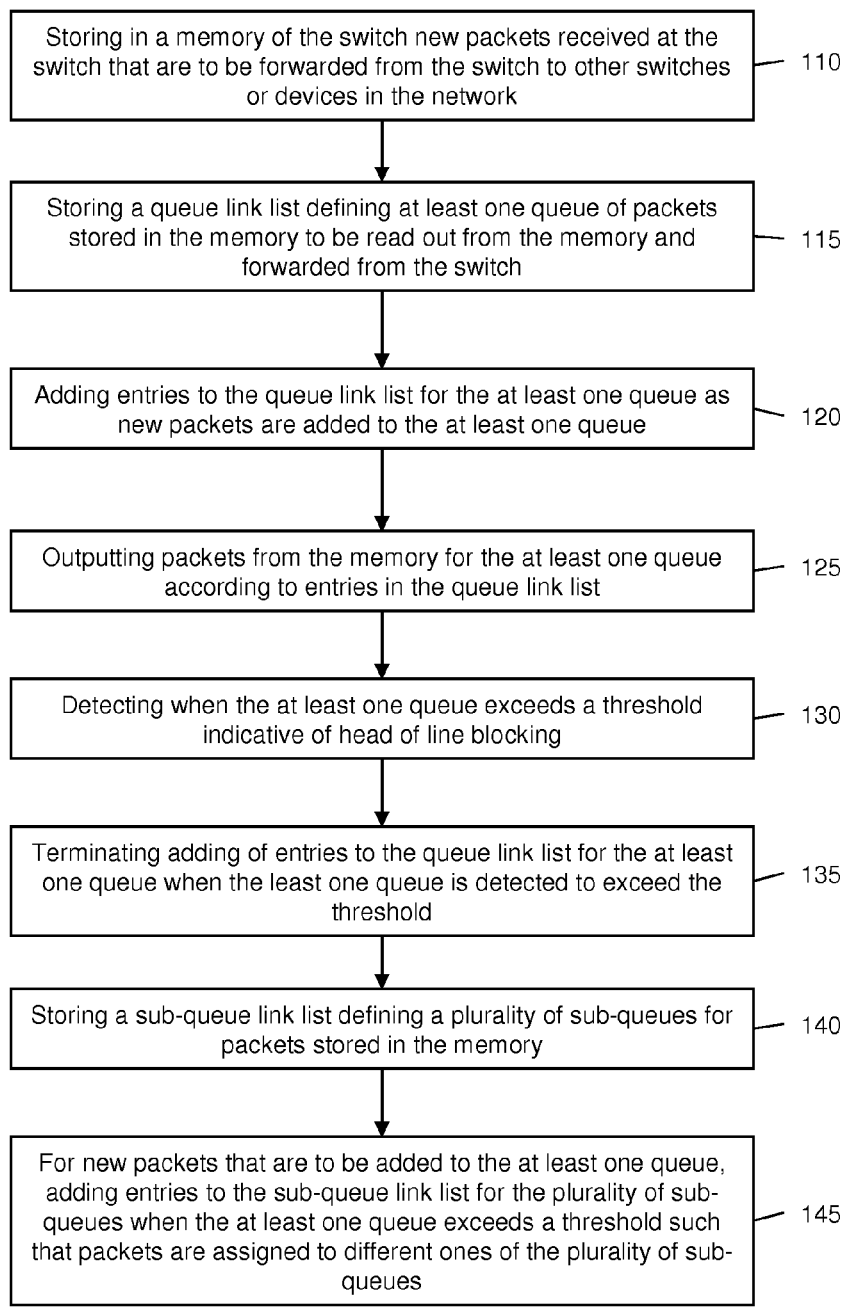
FIGS. 6 and 7 depict an example of a flow chart for operations of the sub-queuing scheme.
Figure 7:
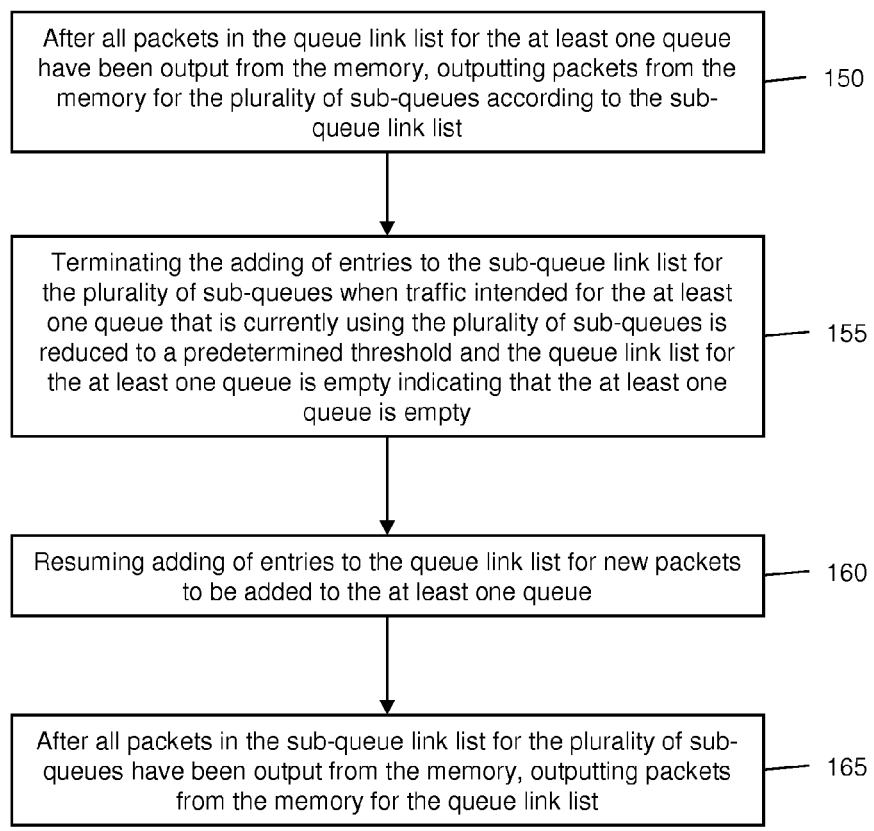

Reference is now made to FIGS. 6 and 7 for a description of a flow chart for a process 100 representing the operations depicted by FIGS. 4 and 5 in a switch, router or other device to use sub-queues for HOL blocking avoidance. The description of FIGS. 6 and 7 also involves reference to the block diagram of FIG. 2. At 110, the switch stores in memory, e.g., memory arrays 56, new packets that it receives and which are to be forwarded from the switch to other switches or devices in a network. At 115, the switch stores a queue link list, in memory 59, that defines at least one queue of packets stored in memory 56 to be read out from the memory 56 and forwarded from the switch. As explained above in connection with FIGS. 4 and 5, the sub-queuing techniques are applicable when there is a single class of service queue or multiple classes of service queues. When multiple classes of service of packets are supported by the switch, then the storing operation 115 involves storing a plurality of queue link lists for a plurality of queues each associated with a corresponding one of a plurality of classes of services. Moreover, the storing operation at 110 involves storing in the memory arrays 56 packets from flows that belong to any one of the plurality of classes of service such that packets for a particular class of service are added to the same queue link list for a corresponding one of the plurality of queues.

At 120, the switch adds entries to the queue link list for the at least one queue as new packets are added to the at least one queue. When multiple classes of service are supported by the switch, the adding operation 120 involves adding entries to corresponding ones of the plurality of queue link lists for new packets based on the classes of service of the new packets.

At 125, the read logic circuit 62 reads packets from the memory arrays 56 and for output via output circuit 64 for the at least one queue according to entries in the queue link list stored in the memory 59.

At 130, the queue level monitor circuit 60 detects when the at least one queue exceeds a threshold that is indicative of HOL blocking. The queue level monitor circuit 60 may make this determination based on the number of packets in the at least one queue exceeding a threshold or the number of bytes in the queue exceeding a threshold (to account for packets of a variety of payload sizes such that some packets may comprise more bytes than other packets). When this occurs, at 135, packets intended for that queue are no longer added to it and adding of entries to the queue link list for the at least one queue is terminated. When the switch supports multiple classes of service, the detecting operation comprises detecting when any one of the plurality of queues exceeds the threshold indicative of head of line blocking for a given one of the plurality of queues.

At 140, a sub-queue link list is generated and stored in memory 59 that defines a plurality of sub-queues 72(0)-72(L-1) for packets stored in memory 56 for the at least one queue. Then, at 145, for new packets that are to be added to the at least one queue, entries are added to the sub-queue link list for the plurality of sub-queues 72(0)-72(L-1) when the at least one queue exceeds a threshold such that packets are assigned to different ones of the plurality of sub-queues 72(0)-72(L-1). The assignment of packets to sub-queues is made by the 5-bit hashing circuit 74 that performs a hashing computation that is configured to ensure that packets for a given flow of packets are assigned to the same sub-queue to maintain in order output of packets within a given flow. In the case where multiple classes of service are supported by the switch, the adding operation 145 comprises adding entries for the plurality of sub-queues for those new packets that are to be added to one of the plurality of queues that is determined to exceed the threshold.

While operation 145 is performed for newly received packets for the at least one queue, packets are output from the memory 56 that were in the at least one queue. Eventually, the at least one queue will become empty.

At 150, after all packets in the queue link list for the at least one queue have been output from the memory 59, packets are output for the plurality of sub-queues 72(0)-72(L-1) are output, via read logic circuit 62 and output circuit 64, from the memory 56 according to the sub-queue link list in memory 59.

At 155, when traffic intended for the at least one queue (that is currently using the plurality of sub-queues 72(0)-72(L-1)) reduces to a predetermined threshold and the queue link list for the at least one queue is empty (indicating that the at least one queue is empty), then adding of entries to the sub-queue link list for the plurality of sub-queues is terminated. At this point, packets can be added to the original queue link list for the at least one queue. Thus, at 160, adding of entries to the queue link list for new packets to be added to the at least one queue is resumed. At 165, after all packets in the sub-queue link list for the plurality of queues have been output from memory 56, via read logic circuit 62 and output circuit 64, packets are output from the memory 56 for at least one queue according to the queue link list for that queue.

Figure 8:
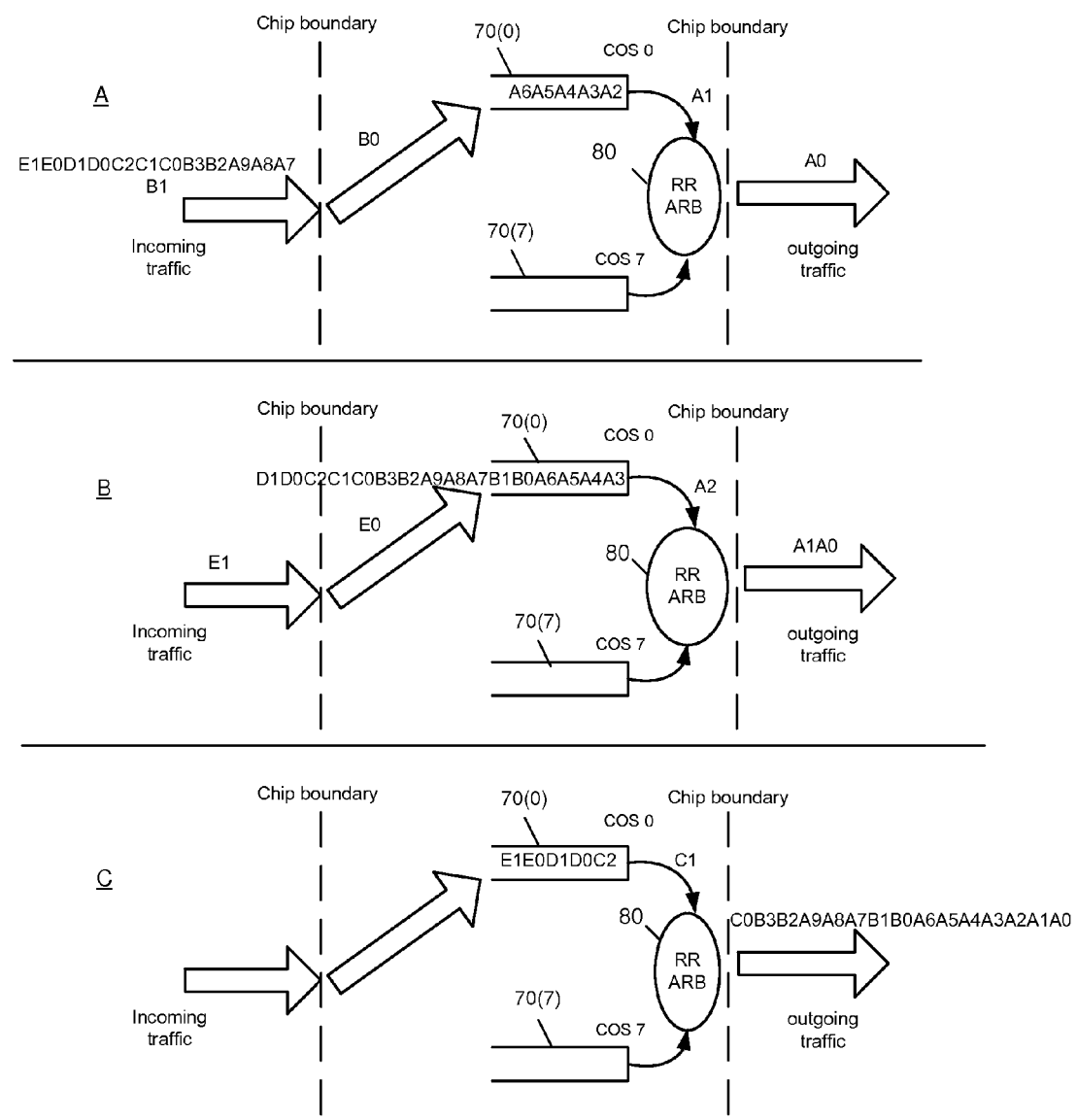
FIG. 8 illustrates an example of a head of line blocking problem caused by one packet flow of a plurality of packet flows.
Figure 9:
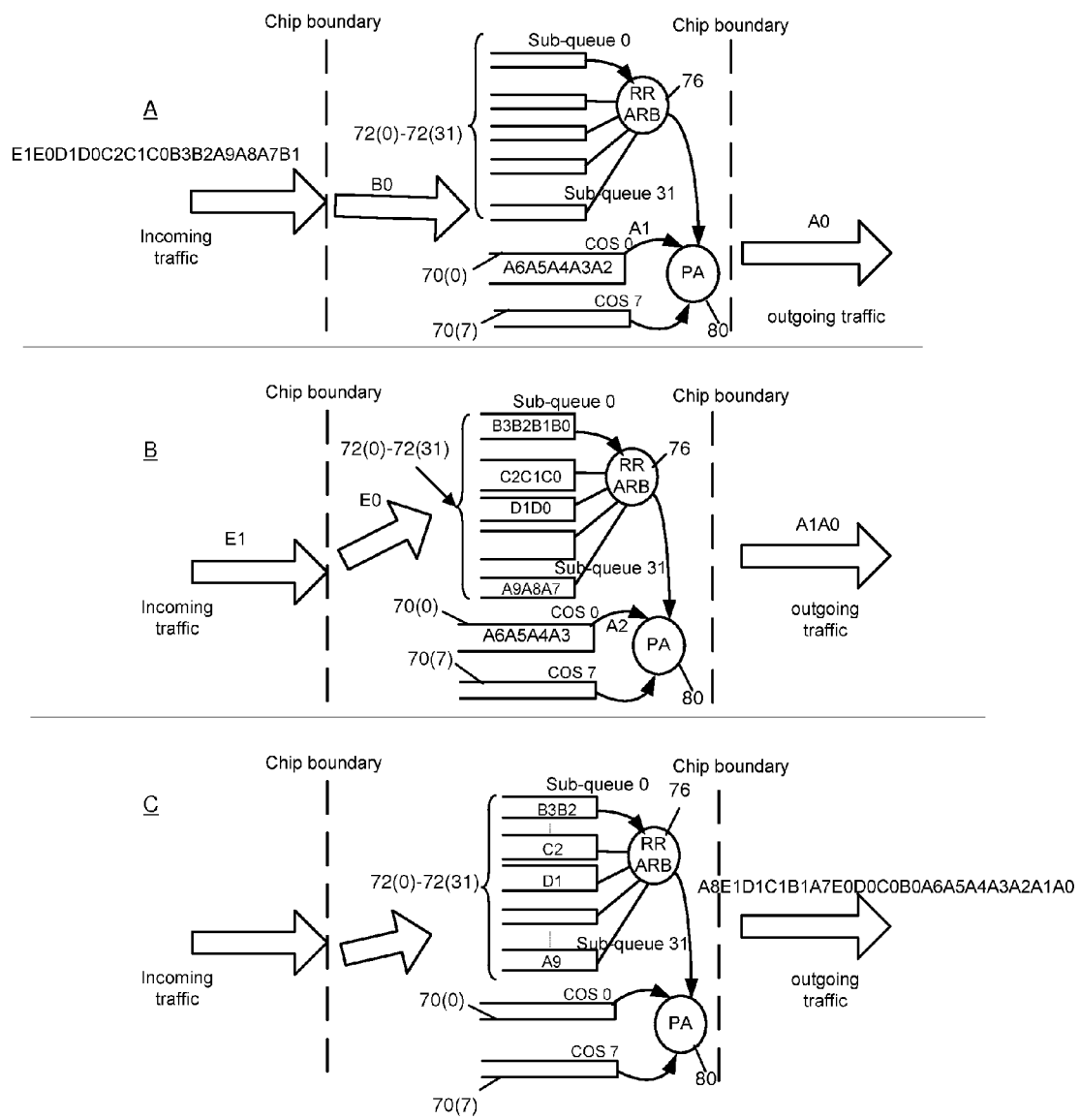
FIG. 9 illustrates an example of the sub-queuing scheme applied to the head of line blocking problem depicted in FIG. 8.

Reference is now made to FIG. 8 for a description of a scenario in which a HOL blocking problem arises. FIG. 9 is thereafter described that illustrates how the sub-queuing techniques described herein alleviate the HOL blocking problem. The "chip boundary" indicated in FIGS. 8 and 9 refers to an ASIC comprising the memory arrays 56 depicted in FIG. 2.

In the example scenario depicted in FIG. 8, there are five flows labeled A, B, C, D, and E, each flow comprising some number of packets all of which belong to the same COS. In this example, flow A is more "bursty" than the other flows and it has packets A5:A1 scheduled to be forwarded sitting in the COS 0 queue. Packet A1 is in the process of being forwarded while packet A0 has already been forwarded. For this example, packets A5:A2 are assumed to be relatively large packets compared to other packets. At stage A, packet B0 of flow B is being enqueued to COS 0. The other incoming packets will also be enqueued to the COS 0 queue. HOL blocking occurs as packets A5:A2 will block the packets from the other flows as indicated at stage B. As shown at stage C, the packets are forwarded in the order they were received.

FIG. 9 is now described to illustrate how the HOL blocking problem for the scenario depicted in FIG. 8 is alleviated using the sub-queuing techniques described herein. The plurality of sub-queues are shown at 72(0)-72(31) in FIG. 9. Stage A in FIG. 9 is the same as that shown in FIG. 8 stage A. Stage B shows the enqueue of flows to the sub-queues once detection of HOL blocking is determined for the COS queue 70(0). Stage C shows that the order of flows out of the chip is different from the incoming flow order. However, the order of packets within a flow is left undisturbed.

Figure 10:
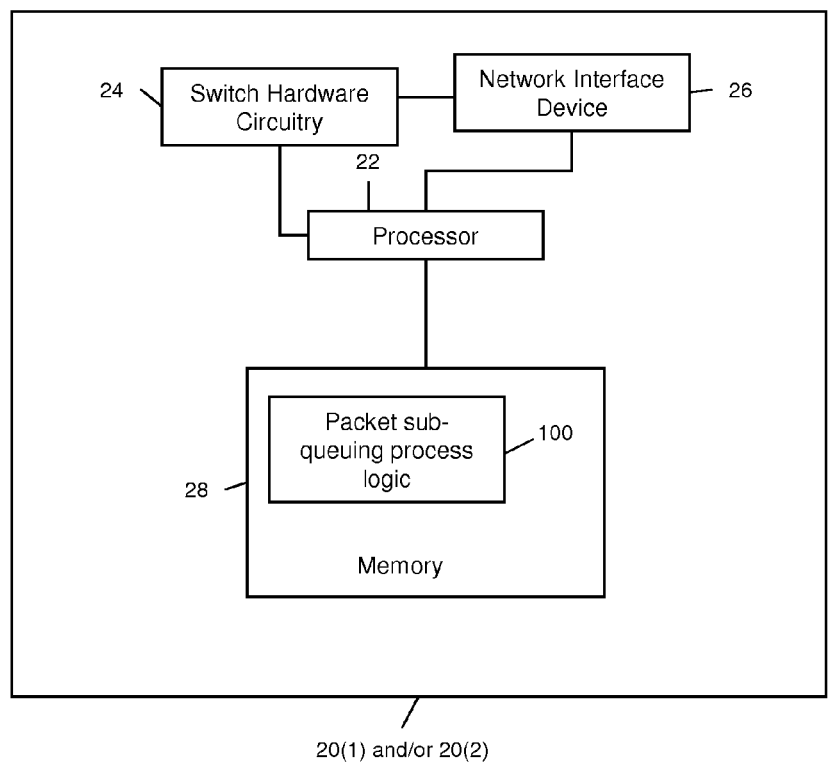
FIG. 10 is another example of a block diagram of a switch, router or other device configured to perform the sub-queuing scheme.

Turning now to FIG. 10, a block diagram is shown for a switch, router or other device configured to perform the sub-queuing techniques described herein. In this version of the device block diagram, the device performs the sub-queuing techniques using software executed by a processor in the switch. To this end, the switch comprises a processor 22, switch hardware circuitry 24, a network interface device 26 and memory 28. The switch hardware circuitry 24 is, in some examples, implemented by digital logic gates and related circuitry in one or more application specific integrated circuits (ASICs), and is configured to route packets through a network using any one of a variety of networking protocols. The network interface device 26 sends packets from the switch to the network and receives packets from the network that are sent to the switch. The processor 22 is, for example, a microprocessor, microcontroller, digital signal processor or other similar data processor configured for embedded applications in a switch.

The memory 28 may comprise read only memory (ROM), random access memory (RAM), magnetic disk storage media devices, optical storage media devices, flash memory devices, electrical, optical, acoustical or other physical/tangible memory storage devices. The memory 28 stores executable software instructions for packet sub-queuing process logic 100 as well as the link lists for the regular COS queues and for the sub-queues as well as the packets to be output. Thus, the memory 28 may comprise one or more computer readable storage media encoded with software comprising computer executable instructions and when the software is executed operable to perform the operations described in connection with FIGS. 6 and 7 for the process logic 100.

The sub-queuing techniques described herein provide a dynamic scheme to alleviate the problem of HOL blocking that is quite common in today's switches and routers that process bursty traffic and variable length frames. The sub-queuing scheme uses less resources compared to a static approach and is invoked only when is needed, thus saving on power as well.

The above description is intended by way of example only.

What is claimed is:

1. A method comprising:
at a device configured to forward packets in a network, storing in a memory of the device new packets that are to be forwarded from the device to devices in the network;
storing a queue link list defining at least one queue of packets stored in the memory to be read out from the memory and forwarded from the device and adding entries to the queue link list for the at least one queue as new packets are added to the at least one queue;
outputting packets from the memory for the at least one queue according to entries in the queue link list;
detecting when the at least one queue exceeds a threshold indicative of head of line blocking and terminating adding of entries to the queue link list for the at least one queue when the at least one queue is detected to exceed the threshold;
storing a sub-queue link list defining a plurality of sub-queues for packets stored in the memory;
for new packets that are to be added to the at least one queue, adding entries to the sub-queue link list for the plurality of sub-queues indicating that the new packets are assigned to one or more of the sub-queues such that packets are assigned to different ones of the plurality of sub-queues when the at least one queue exceeds the threshold while processing packets in the at least one queue; and
outputting packets from the memory for the plurality of sub-queues according to the sub-queue link list after all packets in the queue link list for the at least one queue have been output from the memory.

2. The method of claim 1, wherein adding entries to the sub-queue link list for the plurality of sub-queues comprises adding entries to the sub-queue link list so that packets are assigned to the respective sub-queues according to a hashing computation that is configured to ensure that packets for a given flow of packets are assigned to the same sub-queue to maintain in order output of packets within a given flow.

3. The method of claim 1, wherein outputting packets from the memory for the plurality of sub-queues comprises outputting packets stored in the memory that are assigned to respective ones of the plurality of sub-queues in a round robin fashion.

4. The method of claim 1, and further comprising terminating the adding of entries to the sub-queue link list for the plurality of sub-queues when traffic intended for the at least one queue that is currently using the plurality of sub-queues is reduced to a predetermined threshold and the queue link list for the at least one queue is empty indicating that the at least one queue is empty.

5. The method of claim 4, and further comprising upon terminating the adding of entries to the sub-queue link list, resuming adding of entries to the queue link list for new packets to be added to the at least one queue, and after all packets in the sub-queue link lists for the plurality of sub-queues have been output from the memory, outputting packets from the memory for the queue link list.

6. The method of claim 1, wherein storing the queue link list and storing the sub-queue link list in a plurality of registers.

7. The method of claim 1, wherein storing the queue link list comprises storing a plurality of queue link lists for a plurality of queues each associated with a corresponding one of a plurality of classes of service, wherein storing in the memory comprises storing packets from flows of packets that belong to any one of the plurality of classes of service such that packets for a particular class of service are added to the same queue link list for a corresponding one of the plurality of queues, and wherein adding entries to the queue link list comprises adding entries to corresponding ones of the plurality of queue link lists for new packets based on the classes of service of the new packets.

8. The method of claim 7, wherein detecting comprises detecting when any one of the plurality of queues exceeds the threshold indicative of head of line blocking for a given one of the plurality of queues, and wherein adding entries to the sub-queue link list comprises adding entries for the plurality of sub-queues for those new packets that are to be added to one of the plurality of queues that is determined to exceed the threshold.

9. An apparatus comprising:
a network interface device configured to enable communications over a network;
switch circuitry configured to forward packets over the network and receive packets from the network;
memory configured to store packets to be forwarded over the network; and
a processor configured to be coupled to the network interface device and to the switch circuitry, the processor configured to:
store a queue link list defining at least one queue of packets stored in the memory to be read out from the memory and forwarded over the network, and to add entries to the queue link list for the at least one queue as new packets are added to the at least one queue;
output packets from the memory for the at least one queue according to entries in the queue link list;
detect when the at least one queue exceeds a threshold indicative of head of line blocking and terminate adding of entries to the queue link list for the at least one queue when the at least one queue is detected to exceed the threshold;
store a sub-queue link list defining a plurality of sub-queues for packets stored in the memory;
for new packets that are to be added to the at least one queue, add entries to the sub-queue link list for the plurality of sub-queues indicating that the new packets are assigned to one or more of the sub-queues such that packets are assigned to different ones of the plurality of sub-queues when the at least one queue exceeds the threshold while processing packets in the at least one queue; and output packets from the memory for the plurality of sub-queues according to the sub-queue link list after all packets in the queue link list for the at least one queue have been output from the memory.

10. The apparatus of claim 9, wherein the processor is configured to add entries to the sub-queue link list for the plurality of sub-queues comprises so that packets are assigned to the respective sub-queues according to a hashing computation that is configured to ensure that packets for a given flow of packets are assigned to the same sub-queue to maintain in order output of packets within a given flow.

11. The apparatus of claim 9, wherein the processor is configured to terminate the adding of entries to the sub-queue link list for the plurality of sub-queues when traffic intended for the at least one queue that is currently using the plurality of sub-queues is reduced to a predetermined threshold and the queue link list for the at least one queue is empty indicating that the at least one queue is empty.

12. The apparatus of claim 9, wherein the processor is configured to upon terminating the adding of entries to the sub-queue link list, resume adding of entries to the queue link list for new packets to be added to the at least one queue, and after all packets in the sub-queue link lists for the plurality of sub-queues have been output from the memory, output packets from the memory for the queue link list.

13. The apparatus of claim 9, wherein the processor is configured to store a plurality of queue link lists for a plurality of queues each associated with a corresponding one of a plurality of classes of service, and to store packets from flows of packets that belong to any one of the plurality of classes of service such that packets for a particular class of service are added to the same queue link list for a corresponding one of the plurality of queues, and to add entries to corresponding ones of the plurality of queue link lists for new packets based on the classes of service of the new packets.

14. The apparatus of claim 13, wherein the processor is configured to detect when any one of the plurality of queues exceeds the threshold indicative of head of line blocking for a given one of the plurality of queues, and to add entries for the plurality of sub-queues for those new packets that are to be added to one of the plurality of queues that is determined to exceed the threshold.

15. An apparatus comprising:

means for storing packets that are to be forwarded in a network;

means for storing a queue link list defining at least one queue of packets stored in the means for storing to be read out from the means for storing and for storing a sub-queue link list defining a plurality of sub-queues for packets stored in the means for storing;

means for adding entries to the queue link list for the at least one queue as new packets are added to the at least one queue;

means for detecting when the at least one queue exceeds a threshold indicative of head of line blocking;

wherein the means for adding entries is configured to add entries to the sub-queue link list for the plurality of sub-queues indicating that the new packets are assigned to one or more sub-queues such that packets are assigned to different ones of the plurality of sub-queues when the at least one queue exceeds the threshold while processing packets in the at least one queue; and means for outputting packets from the means for storing for the plurality of sub-queues according to the sub-queue link list after all packets in the queue link list for the at least one queue have been output from the means for storing.

16. The apparatus of claim 15, wherein the means for adding is configured to add entries to the sub-queue link list so that packets are assigned to the respective sub-queues according to a hashing computation that is configured to ensure that packets for a given flow of packets are assigned to the sub-queue to maintain in order output of packets within a given flow.

17. The apparatus of claim 16, wherein the means for adding comprises a hashing circuit configured to perform a hashing computation based on parameters of packets.

18. The apparatus of claim 15, wherein the means for storing the queue link list and the sub-queue link list comprises a plurality of registers.

19. The apparatus of claim 15, wherein the means for storing the queue link list is further configured to store a plurality of queue link lists for a plurality of queues each associated with a corresponding one of a plurality of classes of service, and wherein the means for storing packets is configured to store packets from flows of packets that belong to any one of the plurality of classes of service such that packets for a particular class of service are added to the same queue link list for a corresponding one of the plurality of queues, and wherein the means for adding is configured to add entries to corresponding ones of the plurality of queue link lists for new packets based on the classes of service of the new packets.

20. The apparatus of claim 19, wherein the means for detecting is configured to detect when any one of the plurality of queues exceeds the threshold indicative of head of line blocking for a given one of the plurality of queues, and wherein the means for adding is configured to add entries for the plurality of sub-queues for those new packets that are to be added to one of the plurality of queues that is determined to exceed the threshold.

21. One or more non-transitory computer readable storage media encoded with software comprising computer executable instructions and when the software is executed operable to:

at a device configured to forward packets in a network, store in a memory of the device new packets that are to be forwarded from the device to other devices in the network;

store a queue link list defining at least one queue of packets stored in the memory to be read out from the memory and forwarded from the device and add entries to the queue link list for the at least one queue as new packets are added to the at least one queue;

output packets from the memory for the at least one queue according to entries in the queue link list;

detect when the at least one queue exceeds a threshold indicative of head of line blocking and terminate adding of entries to the queue link list for the at least one queue when the at least one queue is detected to exceed the threshold;

storing a sub-queue link list defining a plurality of sub-queues for packets stored in the memory;

for new packets that are to be added to the at least one queue, add entries to the sub-queue link list for the plurality of sub-queues indicating that the new packets are assigned to one or more sub-queues such that packets are assigned to different ones of the plurality of sub-queues when the at least one queue exceeds the threshold while processing packets in the at least one queue; and output packets from the memory for the plurality of sub-queues according to the sub-queue link list after all packets in the queue link list for the at least one queue have been output from the memory.

22. The one or more non-transitory computer readable storage media of claim 21, wherein the instructions that are operable to add entries to the sub-queue link list comprise instructions that are operable to add entries to the sub-queue link list so that packets are assigned to the respective sub-queues according to a hashing computation that is configured to ensure that packets for a given flow of packets are assigned to the same sub-queue to maintain in order output of packets within a given flow.

23. The one or more non-transitory computer readable storage media of claim 21, and further comprising instructions that are operable to terminate the adding of entries to the sub-queue link list for the plurality of sub-queues when traffic intended for the at least one queue that is currently using the plurality of sub-queues is reduced to a predetermined threshold and the queue link list for the at least one queue is empty indicating that the at least one queue is empty.

* * * * *